3,595,810
ZINC CHROMIUM FERRITE CATALYST
William L. Kehl, Indiana Township, Allegheny County, Pa., assignor to Gulf Research & Chemical Company, Pittsburgh, Pa.
No Drawing. Division and Continuation-in-part of application Ser. No. 493,222, Oct. 5, 1965. This application June 24, 1969, Ser. No. 836,138
Int. Cl. B01j 11/06, 11/32
U.S. Cl. 252—468          13 Claims

ABSTRACT OF THE DISCLOSURE

A hydrocarbon conversion catalyst comprising zinc, chromium, iron and oxygen in a zinc chromium ferrite spinel-type structure.

---

This application is a division and continuation-in-part of United States patent application Ser. No. 493,222 filed Oct. 5, 1965, now abandoned.

The present invention relates to catalysts useful in the conversion and treatment of hydrocarbons, and more particularly it relates to zinc chromium ferrites of a spinel-type structure and having a surface area of catalytic magnitude.

Spinel is magnesium aluminate, $MgAl_2O_4$, of distinct crystalline structure. Many other materials having the general formula, $AB_2O_4$, in which A is a divalent metal cation and B is a trivalent metal cation possess the spinel-like crystalline structure. For example, zinc ferrite, $ZnFe_2O_4$, is a spinel-like material. When so formed that it possesses a surface area of catalytic magnitude and when used for the catalytic conversion of hydrocarbons, it is found to reduce quite easily to a low state of oxidation, in which form it exhibits significantly reduced selectivity for the desired catalyzed reaction.

I have discovered that a spinel-type material made from zinc, chromium and iron as the active components thereof and having a surface area of catalytic magnitude possesses excellent as well as unexpected catalytic activity for the conversion of hydrocarbons with excellent stability against decrease in conversion and activity over long periods of use. For example, the zinc chromium ferrite catalyst of this invention can be used continuously, without the frequent need for regeneration, in the oxydehydrogenation of butenes to butadiene. The catalyst of this invention can have the cations contained in a single phase spinel-type compound, that is a homogeneous zinc chromium ferrite, or as a heterogeneous composition containing a mixture of one or more of the oxides of said cations as well as the single phase, three cation spinel compound.

The catalyst of the present invention can be represented by the empirical formula $Zn_xCr_yFe_zO_4$ wherein $x$ can vary within the range of from about 0.1 to about 3, $y$ can vary from greater than 0 to less than 2 and $z$ can vary from greater than 0 to less than 3. In a preferred form of the catalyst $x$ can vary within the range of about 0.1 to about 2.0, $y$ can vary from about 0.1 to about 1.8 and $z$ can vary from about 0.25 to about 1.9 while in a more preferred form $x$ can vary from about 0.8 to about 1.3, $y$ can vary from about 0.2 to about 1.5 and $z$ can vary from about 0.5 to about 1.8. In the most preferred form of the catalyst $x$ is about 1.0.

In the normal spinel structure the oxygen atoms are arranged on a face-centered cubic close-packed lattice with the divalent atoms being surrounded with tetrahedral groups of four oxygen atoms and the trivalent atoms being surrounded by octahedral groups of six oxygen atoms. Deviations from this normal structure can occur as a result of variations in the atomic sizes, ionic forces, site preference stabilization energies, and the like. These deviations can result in disorder, distortion or irregularity in the spinel lattice and can involve a distribution of the divalent and trivalent cations in the tetrahedral and octahedral sites different from the ideal spinel structure. These deviations result in deformation and straining of the lattice which in turn cause localized unbalanced charge distributions in the crystal. It is my belief that my novel combination of zinc, chromium and iron in the spinel-type structure causes deviations, in general, of the type described which are responsible for the unexpectedly enhanced catalytic activity and stability.

In the homogeneous structure, all of the elements are located in a single phase zinc chromium ferrite compound. In the ideal homogeneous structure zinc occupies tetrahedral sites because of its low octahedral site stabilization energy and the chromium and iron occupy octahedral sites. Therefore, $x$ is 1.0 and the sum of $x+y+z$ is 3.0 in this ideal structure. However, this ideal structure is unlikely to be encountered since a minor amount of the zinc will likely end up in octahedral sites and a minor amount of the iron will likely end up in tetrahedral sites. In view of this, in the actual homogeneous zinc chromium ferrite $x$ is about 1.0, the sum of $y+z$ is about 2.0, and the sum of $x+y+z$ is about 3.0. In this empirical formula $x$, $y$ and $z$ are normalized to fit the valence requirements of four oxygen atoms.

In the heterogeneous composition, also represented by the empirical formula $Zn_xCr_yFe_zO_4$, the single phase zinc chromium ferrite compound will be present as well as one or more oxides or combined oxides of one or more of the constituent cations. For example, if $x$ is about 3 in the empirical formula for the composition, the catalyst will contain a major amount of zinc oxide and a minor amount of a zinc chromium ferrite compound. In this instance the composition will possess its desired catalytic activity due to the zinc chromium ferrite compound. The zinc oxide may have a minor effect depending on the reactants and/or conditions. When $x$ in the empirical formula is significantly less than 1.0, for example 0.5, the catalytic material will consist of a mixture of zinc chromium ferrite compound and chromium and/or iron oxides. Chromium and/or iron oxides, when present, may not be inert, i.e., they can have some activity with lower selectivity for the desired reaction, thereby somewhat reducing the high conversions and selectivity obtained when using the homogeneous zinc chromium ferrite catalyst.

The zinc chromium ferrites can be conveniently prepared by employing as starting materials salts of zinc, chromium and iron, in which salts the metals are contained as cations. Any such salt of said metals is satisfactory, however, it is preferred to employ salts of the metals which contain readily volatilizable anions, such as, for example, nitrates, carbonates, acetates and halides in order to avoid catalyst contaminants. These salts containing the metals as cations are then admixed with a basic reactant in order to precipitate the precursor of the final product. It is necessary to maintain this addition mixture at a high pH—above about 8, and preferably above about 9. It is considered preferable to vigorously stir the metal salts in order to reduce any pH gradients through said addition mixture.

In order to prevent the inclusion of any contaminant in the final product, it is preferred that either a volatilizable base or a base containing no deleterious contaminants such as, for example, sodium be employed. Any base which can be vaporized readily under the conditions used for drying and calcining can be employed, such as, for example, ammonium carbonate, ammonium bicarbonate and ammonium hydroxide. It is generally considered preferable, however, to employ an aqueous ammonia solution as the volatilizable base.

After precipitation, advantageously the precursor is washed, again at a pH above about 8, and preferably above about 9, and then dried and calcined. This drying and calcining can effectively be accomplished by any of the techniques well known in the art. Generally, drying can be accomplished at temperatures from about 100° C. to about 150° C. for a period of from about 4 to about 60 hours while calcining can be effected at temperatures ranging from about 500° C. to about 1,000° C. for a period of from about 2 to 16 hours.

It has been found that iron hydroxide precipitates from an aqueous solution of $Fe(NO_3)_3 \cdot 9H_2O$ in ammonium hydroxide substantially completely at pH 11.0 to 11.5, while chromium and zinc hydroxides precipitate most completely from an aqueous solution of their nitrates in ammonium hydroxide at a pH of about 9.0. Accordingly, one method for the preparation of zinc chromium ferrite comprises co-precipitating the zinc and chromium hydroxide in ammonium hydroxide at a pH of about 8.8 to 9.0 in one container, and precipitating the iron hydroxide separately in ammonium hydroxide at a pH of about 11.3 in a second container. After both precipitates have been washed several times by decantation, they are combined, mixed thoroughly, preferably with heating at about 90° C., for several hours. Thereafter, the resulting mixture of the combined precipitates is recovered by filtration, dried at about 120° C. and calcined for 16 hours at about 650° C. to form the zinc chromium ferrite catalyst.

The catalyst can be employed with or without a filler or carrier material and can be pelletized or formed employing conventional techniques. Suitable carrier materials are, for example, rough granular aluminas, zirconias, granular silicon carbide and other similar inert materials. Supported catalysts can be prepared by thoroughly mixing the granular particles of the carrier material with a thick wet slurry of the washed mixture of combined precipitates prior to drying and calcining. The slurried mixture can thereafter be dried at about 120° C. and calcined at about 650° C. to provide granular particles of the supported catalyst. The unsupported catalyst, in general, has been found to be more satisfactory particularly from the aspect of catalyst life.

In order that this zinc chromium ferrite composition possess catalytic activity for the conversion of hydrocarbons it is essential that it be formulated with a significant surface area, that is, a surface area of at least about 0.1 to about 0.5 m.$^2$/g. and preferably a surface area of at least about 1.0 m.$^2$/g. For example, in the oxydehydrogenation of butene-1 to form butadiene, a surface area of about 5 m.$^2$/g. has been found to be satisfactory. In using a surface area significantly higher than this it has been found that it is more difficult to extract the heat evolved in this highly exothermic reaction. For some uses a surface area of at least about 10 m.$^2$/g. is preferred. In making the unsupported zinc chromium ferrite material, a surface area of about 30 to about 50 m.$^2$/g. can be produced. If a finished catalyst of lower surface area is desired, this material is sintered under controlled conditions to reduce the surface area to a desired level. The supported zinc chromium ferrite can be produced with a higher surface area than the unsupported material, if desired, with the resulting supported surface area being a function of the surface area of the support.

We now describe by way of specific examples the use of our invention, however, these examples are not to be construed in any manner as limiting our invention.

EXAMPLE 1

A solution was made up containing 74.5 grams of $Zn(NO_3)_2 \cdot 6H_2O$ and 100 grams of $Cr(NO_3)_3 \cdot 9H_2O$ in 2,750 cc. of distilled water. Dilute ammonium hydroxide was added slowly to this solution with vigorous stirring until the pH reached 8.8. About 350 cc. of acetone was added and the liquid was decanted from the precipitate after it had settled. A second solution containing 114 grams of $Fe(NO_3)_3 \cdot 9H_2O$ dissolved in 1,500 cc. of water was slowly added to a dilute solution of ammonium hydroxide at a pH of about 11.3 and a dilute solution of ammonium hydroxide was concurrently added at a rate sufficient to maintain the pH at about 11.3. After settling, the liquid was decanted from the precipitate. The two precipitates were mixed together and vigorously stirred. The mixture was filtered, dried at 120° C. and a portion calcined at 650° C. for 16 hours and another portion calcined at 750° C.

The portion calcined at 650° C. had a surface area of 13.8 m.$^2$/g. and the portion calcined at 750° C. had a surface area of 7.1 m.$^2$/g. X-ray diffraction analysis of the product calcined at 650° C. showed that the major constituent was a zinc chromium ferrite spinel with minor amounts of zinc oxide and a mixed oxide of iron and chromium also present. When the catalyst was used for several cycles in the oxidative dehydrogenation of butene-1 to butadiene followed by heating in an oxygen-containing gas at 500° C., the separate oxide phases disappeared into the zinc chromium ferrite spinel structure. The spinel structure was determined to have the composition $$ZnCr_{.95}FeO_4$$

by X-ray fluorescence analysis, which was within experimental error for the composition $ZnCrFeO_4$.

It was discovered in repeated examples for making the composition $ZnCrFeO_4$ that sometimes, following calcination, separate oxide phases were present and that sometimes they were not present. It was determined that the higher the calcination temperature, the more likely that only the spinel structure would result.

The characteristic X-ray diffraction pattern for this zinc chromium ferrite spinel-type material having the empirical formula of about $ZnCrFeO_4$ consists of lines with the following $d$ spacings and relative intensities:

| $d$(A.): | $I/I_o$ |
|---|---|
| 4.84 | 10 |
| 2.99 | 35 |
| 2.54 | 100 |
| 2.43 | 10 |
| 2.10 | 20 |
| 1.72 | 12 |
| 1.62 | 30 |
| 1.49 | 40 |

The relative intensities and the width or sharpness of the lines in the patterns from these compounds will vary with changes in the relative concentrations of the cations in the structure. Inhomogeneity in the catalyst compositions is manifested by additional or doubled lines in the pattern.

A 6.7 to 1 mixture of butane to butene-1 admixed with steam and oxygen in a mole ratio of steam to butene-1 to oxygen of 10 to 1.5 to 1 was passed over this catalyst having the formula $ZnCrFeO_4$ at a gas hourly space velocity of 675 based on the butene-1 and a temperature of 350° C. A 66 percent conversion of the butene-1 resulted with a selectivity to butadiene of 93 percent and a yield of 61 percent. The reaction of butene-1 to butadiene has been carried out for several weeks without sufficient loss in activity or selectivity to require regeneration. When regeneration is required, the catalyst is calcined in air at 500° to 650° C.

EXAMPLE 2

A solution of 134.7 grams of $Fe(NO_3)_3 \cdot 9H_2O$ in 500 cc. of water was slowly added with vigorous stirring to a dilute ammonium hydroxide solution at a pH of 10.5 together with sufficient additional ammonium hydroxide to maintain the pH of the solution at 10.5. The resulting precipitate was separated by decantation. A separate solution containing 9.9 grams of $Zn(NO_3)_2 \cdot 6H_2O$ and 133.4 grams $Cr(NO_3)_3 \cdot 9H_2O$ in 500 cc. of water was slowly added with vigorous stirring to a dilute solution of ammonium hydroxide at a pH of 9.0 together with sufficient additional ammonium hydroxide to maintain the pH at 9.0. The precipitate was separated by decantation, boiled with water and then filtered. The two precipitates were thoroughly mixed and boiled in water, filtered, dried and calcined at 650° C. for 16 hours. X-ray fluorescence analysis indicated that the composition of the calcined material corresponded to the empirical formula $$Zn_{.15}Cr_{1.5}FeO_4.$$

X-ray diffraction analysis indicated that the major component was an iron-chromium oxide $(Fe,Cr)_2O_3$, together with a zinc chromium ferrite spinel as a minor component. The surface area of the calcined material was 15.8 m.²/g. When butene-1 was dehydrogenated at conditions similar to those disclosed in Example 1, a 65 percent conversion resulted with a selectivity of 78 percent and a yield of 51 percent to butadiene.

EXAMPLE 3

A solution containing 74.5 grams of $Zn(NO_3)_2 \cdot 6H_2O$, 10.0 grams $Cr(NO_3)_3 \cdot 9H_2O$ and 216.6 grams $$Fe(NO_3)_3 \cdot 9H_2O$$

in 1000 cc. of distilled water and a dilute ammonium hydroxide solution were slowly added with vigorous stirring to a solution of 200 grams of ammonium bicarbonate in one liter of water in the proper proportions to maintain the pH at 8.3. After washing the precipitate several times by decantation, it was filtered, dried and calcined at 650° C. for 16 hours. X-ray diffraction analysis indicated that the calcined product was a zinc chromium ferrite spinel containing less than three weight percent ferric oxide. The ferric oxide was incorporated into the spinel structure after several reduction-oxidation cycles as explained in Example 1. X-ray fluorescence analysis indicated an empirical formula of $ZnCr_{.1}Fe_{1.9}O_4$ for the composition. When this catalyst was used in the oxidative dehydrogenation of butene-1 to butadiene at conditions similar to those disclosed in Example 1, a conversion of 61 percent and a selectivity of 92 percent and yield of 56 percent was obtained.

EXAMPLE 4

A solution contaniing 74.5 grams of $Zn(NO_3)_2 \cdot 6H_2O$, 25 grams of $Cr(NO_3)_3 \cdot 9H_2O$ and 199.5 grams of $$Fe(NO_3)_3 \cdot 9H_2O$$

in one liter of water and a separate dilute ammonium hydroxide solution were slowly added to a solution of 200 grams of ammonium bicarbonate as in Example 3. The resulting calcined precipitate possessed a surface area of 7.8 m.²/g. X-ray diffraction analysis indicated that the material was a zinc chromium ferrite and X-ray fluorescence analysis indicated the empirical composition to be $ZnCr_{.25}Fe_{1.75}O_4$. This material catalyzed the oxidative dehydrogenation of butene-1 to butadiene at conditions similar to those used in Example 1 at a conversion of 69 percent and a selectivity of 91 percent and yield of 63 percent.

EXAMPLE 5

A precipitate was obtained in the same manner as described in Example 3 using a solution containing 55.9 grams of $Zn(NO_3)_2 \cdot 6H_2O$, 100 grams $Cr(NO_3)_3 \cdot 9H_2O$ and 142.5 grams $Fe(NO_3)_3 \cdot 9H_2O$ in 1000 cc. of distilled water. The precipitate was dried and calcined at 650° C. for 13 hours. X-ray fluorescence analysis indicated that the composition corresponded to the empirical formula $Zn_{.7}CrFe_{1.0}O_4$. X-ray diffraction analysis indicated that the major phase was a zinc chromium ferrite spinel plus a lesser amount of a $(Cr,Fe)_2O_3$ phase. The surface area of the calcined product was 9.0 m.²/g. When used as the catalyst for converting butene-1 to butadiene in the presence of oxygen in a manner similar to that described under Example 1, a conversion selectivity and yield of 64, 87 and 56 percent, respectively, were obtained.

EXAMPLE 6

Another precipitate was obtained in the same manner as described in Example 3 using a solution containing 59.6 grams $Zn(NO_3)_2 \cdot 6H_2O$, 150 grams $Cr(NO_3)_3 \cdot 9H_2O$ and 79.8 grams $Fe(NO_3)_3 \cdot 9H_2O$ in 1000 cc. of distilled water. The precipitate was washed, dried and calcined at 650° C. for 16 hours. X-ray diffraction analysis of the calcined material revealed that a zinc chromium ferrite was the major component together with a lesser amount of a $(Cr,Fe)_2O_3$ phase. X-ray fluorescence analysis indicated an empirical composition corresponding to the formula $Zn_{.8}Cr_{1.5}Fe_{.7}O_4$. The surface area of the calcined product was 19.1 m.²/g. This catalyst oxydehydrogenatively converted butene-1 to butadiene in a manner similar to the procedure described in Example 1 with a conversion of 66 percent and a selectivity of 83 percent and a yield of 55 percent to butadiene.

EXAMPLE 7

Zinc ferrite, $ZnFe_2O_4$, was made by the basic precipitation of a suitably compounded solution of $$Zn(NO_3)_2 \cdot 6H_2O$$

and $Fe(NO_3)_3 \cdot 9H_2O$. The precipitate was washed, dried and calcined. The zinc ferrite was identified by X-ray diffraction analysis and was found to have a surface area of 2.9 m.²/g. When used in the conversion of butene-1 to butadiene at similar conditions as used in Example 1, an initial conversion of 61 percent was obtained with a selectivity of 79 percent and a yield of 42 percent to butadiene. The initial selectivity and yield of the zinc ferrite, which are much lower than the selectivity and yield of the zinc chromium ferrite, possesses the additional disadvantage of rapidly losing its initially modest selectivity and yield characteristic and requires frequent regeneration.

EXAMPLE 8

Zinc chromite, $ZnCr_2O_4$ was made by adding ammonium hydroxide to a solution containing 59.5 grams of zinc nitrate and 160.1 grams of chromium nitrate. The resulting precipitate was washed, dried and calcined. The resulting zinc chromite was identified by X-ray diffraction analysis and was found to have a surface area of 23.4 m.²/g. When used in the conversion of butene-1 to butadiene at 375° C. and at a 10 to 1 to 1 steam to butene to oxygen ratio, an initial conversion of 29 percent with a selectivity of 34 percent and yield of 10 percent to butadiene was obtained.

The catalysts as described herein can also be used for the oxydehydrogenation of aldehydes and ketones at good conversions and excellent selectivities. For example, isobutyraldehyde is converted to methacrolein, methyl ethyl ketone is converted to methyl vinyl ketone, etc. Additionally, it has been unexpectedly discovered that these zinc chromium ferrite catalytic materials catalyze the isomerization of butene-2 to butene-1 in a substantially oxygen-free environment. Also the zinc chromium ferrite catalyst is active for cracking hydrocarbons such as the cracking of 2,4-dimethylpentane.

It is to be understood that the above disclosure is by way of specific example and that numerous modifications and variations are available to those of ordinary skill in the art without departing from the true spirit and scope of the invention.

I claim:

1. A hydrocarbon conversion catalyst comprising a zinc chromium ferrite with a spinel structure and having the empirical formula $Zn_xCr_yFe_zO_4$ wherein $x$ ranges from about 0.1 to about 3, $y$ ranges from greater than 0 to less than 2 and $z$ ranges from greater than 0 to less than 3 and a surface area of at least about 0.1 m.²/g.

2. A hydrocarbon conversion catalyst in accordance with claim 1 in which $x$ is about 1.0.

3. A hydrocarbon conversion catalyst in accordance with claim 1 wherein $x$ ranges from about 0.1 to about 2.0, $y$ ranges from about 0.1 to about 1.8 and $z$ ranges from about 0.25 to about 1.9.

4. A hydrocarbon conversion catalyst in accordance with claim 1 having a surface area of at least about 1.0 m.$^2$/g.

5. A hydrocarbon conversion catalyst in accordance with claim 4 wherein $x$ ranges from about 0.8 to about 1.3, $y$ ranges from about 0.2 to about 1.5 and $z$ ranges from about 0.5 to about 1.8.

6. A hydrocarbon conversion catalyst in accordance with claim 5 in which $x$ is about 1.0.

7. A hydrocarbon conversion catalyst in accordance with claim 6 in which $y$ is about 1.0 and $z$ is about 1.0.

8. A hydrocarbon conversion catalyst in accordance with claim 3 in which $x$ is about 1.0.

9. A hydrocarbon conversion catalyst in accordance with claim 1 carried on an inert support.

10. A hydrocarbon conversion catalyst consisting essentially of zinc chromium ferrite compound with a spinel structure and having the formula $Zn_xCr_yFe_zO_4$ wherein $x$ is about 1, $y$ is between about 0.1 and about 1.8, $z$ is between about 0.25 and about 1.9 and the sum of $y+z$ is about 2.0, said catalyst having a surface area of at least about 0.1 m.$^2$/g.

11. A hydrocarbon conversion catalyst in accordance with claim 10 in which $y$ is between about 0.2 and about 1.5, and $z$ is between about 0.5 and about 1.8.

12. A hydrocarbon conversion catalyst in accordance with claim 11 having a surface area of at least about 1.0 m.$^2$/g.

13. A hydrocarbon conversion catalyst in accordance with claim 12 in which $y$ is about 1 and $z$ is about 1.

References Cited

UNITED STATES PATENTS

| | | | |
|---|---|---|---|
| 3,453,344 | 7/1969 | Aliev | 260—680 |
| 3,450,788 | 6/1969 | Kehl | 260—680 |

DANIEL E. WYMAN, Primary Examiner

P. M. FRENCH, Assistant Examiner

U.S. Cl. X.R.

23—51

PO-1050
(5/69)

UNITED STATES PATENT OFFICE
CERTIFICATE OF CORRECTION

Patent No. 3,595,810              Dated   July 27, 1971

Inventor(s) William L. Kehl

It is certified that error appears in the above-identified patent and that said Letters Patent are hereby corrected as shown below:

Column 1, line 4, "assignor to Gulf Research & Chemical Company," should read --assignor to Gulf Research & Development Company,--. Column 3, line 64, "we" should read --I--. Column 3, line 65, "our" should read --my--. Column 3, line 66, "our" should read --my--. Column 5, line 43, "containing" should read --containing--. Column 5, line 68, "$Zn_{.7}CrFe_{1.0}O_4$." should read --$Zn_{.7}CrFe_{1.2}O_4$.--.

Signed and sealed this 15th day of February 1972.

(SEAL)
Attest:

EDWARD M. FLETCHER, JR.          ROBERT GOTTSCHALK
Attesting Officer                Commissioner of Patents